(12) United States Patent
Gilde

(10) Patent No.: US 12,489,327 B2
(45) Date of Patent: Dec. 2, 2025

(54) COOLED ROTOR OF AN ELECTRIC MACHINE

(71) Applicant: Schaeffler Technologies AG & Co. KG, Herzogenaurach (DE)

(72) Inventor: Christian Gilde, Karlsruhe (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 290 days.

(21) Appl. No.: 18/023,772

(22) PCT Filed: Jul. 30, 2021

(86) PCT No.: PCT/DE2021/100658
§ 371 (c)(1),
(2) Date: Feb. 28, 2023

(87) PCT Pub. No.: WO2022/042792
PCT Pub. Date: Mar. 3, 2022

(65) Prior Publication Data
US 2023/0246501 A1    Aug. 3, 2023

(30) Foreign Application Priority Data
Aug. 28, 2020 (DE) .......................... 102020122523.7

(51) Int. Cl.
*H02K 1/32* (2006.01)
*H02K 1/278* (2022.01)

(52) U.S. Cl.
CPC ............... *H02K 1/32* (2013.01); *H02K 1/278* (2013.01)

(58) Field of Classification Search
CPC ........ H02K 1/2706; H02K 1/278; H02K 1/32; H02K 2201/06
See application file for complete search history.

(56) References Cited

U.S. PATENT DOCUMENTS

2018/0175687 A1* 6/2018 Lang ...................... H02K 17/16
2019/0074742 A1 3/2019 Matsumoto
(Continued)

FOREIGN PATENT DOCUMENTS

DE         10147310        6/2004
JP         2018074759      5/2018
(Continued)

*Primary Examiner* — Christopher M Koehler
*Assistant Examiner* — Ethan Nguyen Vo
(74) *Attorney, Agent, or Firm* — Volpe Koenig

(57) ABSTRACT

A rotor of a dynamoelectric radial flux machine and a dynamoelectric machine having such a rotor are provided. In order to design the rotor to be as efficient and cost-effective as possible, it includes a laminated rotor core with individual laminations stacked axially one above the other. Axially extending and circumferentially distributed cooling ducts and substantially radially extending inflow ducts are arranged within the laminated rotor core. The individual laminations have the same lamination cross-section, the laminated rotor core is formed in a staggered manner from laminated core sub-units that are rotated relative to one another, and each individual lamination includes cooling-duct holes and inflow-duct holes. The inflow-duct holes in the individual laminations of a first laminated core sub-unit axially overlap with the cooling-duct holes in the individual laminations of the remaining laminated core sub-units for forming the axially extending cooling ducts.

12 Claims, 4 Drawing Sheets

(56) References Cited

U.S. PATENT DOCUMENTS

Figure 1:
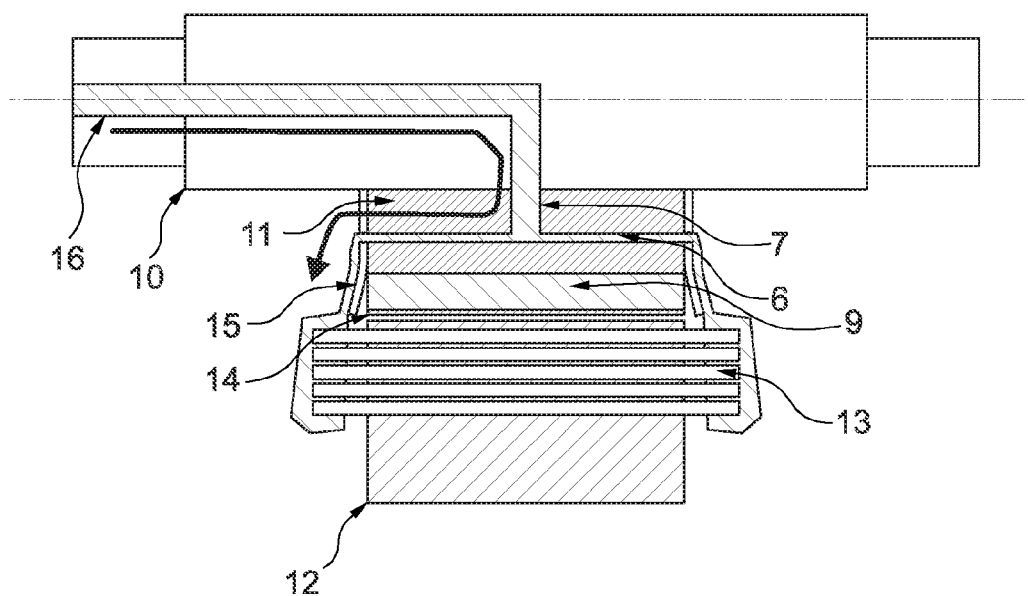

2019/0372414 A1   12/2019  Pyrhonen et al.
2020/0259380 A1    8/2020  Ikemoto et al.
2021/0211008 A1*  7/2021  Yang .................. F04C 29/0078
2022/0399771 A1* 12/2022  Jelinewski ............... H02K 9/19

FOREIGN PATENT DOCUMENTS

JP       2018074759 A  *  5/2018
WO     2017006430       1/2017

* cited by examiner

COOLED ROTOR OF AN ELECTRIC MACHINE

CROSS-REFERENCE TO RELATED APPLICATIONS

This application is the U.S. National Phase of PCT Appln. No. PCT/DE2021/100658, filed Jul. 30, 2021, which claims the benefit of German Patent Appln. No. 102020122523.7, filed Aug. 28, 2020, the entire disclosures of which are incorporated by reference herein.

TECHNICAL FIELD

The disclosure relates to a rotor of a dynamoelectric radial flux machine and to a dynamoelectric machine comprising such a rotor.

BACKGROUND

Because of the losses that occur during operation, electric machines must be effectively cooled. Particularly in the case of high electrical power and the associated comparatively large absolute heat losses, electric machines are often cooled by a closed cooling circuit in which a coolant liquid is routed close to the active parts of the machine. For this purpose, in many cases a cooling jacket is shrunk onto the laminated core of a stator of the electric machine, through which the coolant liquid is routed.

The cooling circuit works more effectively the closer the coolant medium can be brought to the active parts of the electric machine. In this context, it is known to conduct a coolant liquid through bores extending axially in the laminated core of the stator in order to be able to dissipate eddy-current losses and core losses as effectively as possible. Such cooling ducts are often also routed through the stator teeth in a stator having a toothed coil winding, in order to be able to dissipate the ohmic losses generated by the toothed coils.

Heat dissipation at the rotor is more difficult, as this is a rotating part. Rotor cooling concepts are known in which the coolant liquid is injected via a shaft designed as a hollow shaft. The coolant liquid is injected radially outwards to the left and right of the rotor. The coolant liquid runs along the rotor faces and on to the winding heads. This solution only cools the rotor from the end faces and from the inner surface of the hollow rotor shaft.

A liquid-cooled rotor is known from US 2019/0074742 A1, in which the coolant liquid is introduced into a laminated rotor core via a rotor shaft. The laminated rotor core has axially extending cooling ducts. In the central region of the laminated rotor core, viewed axially, there is a substantially radially extending inflow opening, via which the coolant passes from the rotor shaft into the axially extending cooling ducts of the laminated core. Some laminations of the laminated rotor core also comprise radially extending, blind hole-like passages in which any foreign material that has gotten into the coolant is collected.

In particular, permanently excited electric machines have a certain torque ripple during operation. Various measures are known from the prior art for reducing this. For example, DE 101 47 310 A1 mentions a slanting of the stator and/or the rotor by a slot pitch or a specific amount to suppress harmonics of a permanently excited synchronous machine. As an alternative to this slanting, what is termed staggering can also be provided, in which a stator and/or laminated rotor core is subdivided into various laminated core sub-units, which are rotated relative to one another by a predetermined rotation angle.

SUMMARY

The object of the disclosure is to provide a cost-effective and highly efficient rotor for a dynamoelectric machine.

This object is achieved by a rotor having one or more of the features disclosed herein. Advantageous embodiments can be found below and in the claims.

The rotor comprises a laminated rotor core having individual laminations stacked axially one on top of the other. As a rule, these individual laminations are electrically insulated from one another in order to prevent the formation of eddy currents in the rotor. Within the rotor core, cooling ducts are distributed circumferentially, which axially penetrate the rotor core. These cooling ducts are connected to substantially radially extending inflow ducts, via which a coolant medium can be supplied to the axially extending cooling ducts.

The inflow ducts can have an inlet opening, via which a coolant conducted through a rotor shaft can be admitted into the laminated rotor core. In such an embodiment, for example, the rotor shaft itself has an axially extending cooling duct, via which the coolant medium can be introduced into the inlet opening and thus into the inflow ducts. The rotor shaft is designed as a hollow shaft, for example. The coolant medium finally reaches the axially extending cooling ducts within the laminated rotor core via the inflow ducts.

The axially extending cooling ducts can each have an outlet opening at the end face ends of the laminated rotor core, through which the coolant medium leaves the laminated rotor core. A dynamoelectric machine having such a laminated rotor core can be designed, for example, in such a way that the coolant emerging from the outlet openings is sprayed onto the winding heads of the stator winding in order to cool them.

The manufacturing cost of the rotor is significantly reduced in that said individual laminations have the same lamination cross-section. To make this possible, each individual lamination comprises cooling-duct holes and inflow-duct holes.

In particular, to reduce torque ripples, the laminated rotor core is designed in a staggered manner. It comprises a number of laminated core sub-units rotated against one another. The challenge now is to create a staggered rotor having axially continuous cooling ducts with an individual lamination cross-section for the rotor. According to the disclosure, this occurs in that the inflow-duct holes in the individual laminations of a first laminated core sub-units axially overlap with the cooling-duct holes in the individual laminations of the remaining laminated core sub-units. For example, a coolant medium enters from a cooling duct formed in a rotor shaft into the radially extending inflow duct formed in the first laminated core sub-unit. This inflow duct opens into the axially extending cooling ducts of the adjoining laminated core sub-units. For example, due to centrifugal force, the coolant medium is conveyed from the inflow duct into these axial cooling ducts. The cooling ducts of further adjoining laminated core sub-units overlap with the cooling ducts of the cooling ducts adjoining the first laminated core sub-unit, such that continuous cooling ducts result from one end face to the other end face of the rotor. The task of the axially extending cooling duct within the first laminated core sub-unit is taken over by the cross-section of the inflow duct whose cross-sectional area overlaps with the cross-sectional area of the axially extending cooling duct. Finally, the coolant medium can leave the rotor at the outlet openings of the end face-side laminated core sub-units.

The continuity of the axially extending cooling ducts with simultaneous staggering of the rotor can be ensured, for example, in that the inflow-duct holes and the cooling-duct holes are distributed evenly over the circumference of the individual laminations and have a circumferential distance from one another, the radian measure of which corresponds to the rotation angle of axially adjacent laminated core sub-units. Alternatively, the rotation angle can also be an integer multiple of this radian measure.

For example, if the coolant medium is supplied to the rotor core via an axial cooling duct in the rotor shaft in the axial center of the laminated rotor core, it is expedient if the laminated core sub-unit is arranged in the center of the laminated rotor core. With such an embodiment, a uniform distribution of the coolant into the axial cooling ducts on both sides of the first laminated core sub-unit is achieved in a simple manner.

The laminated core sub-units can each be equipped with permanent magnets to generate a rotor field. In order to ensure optimal cooling of the permanent magnets of the rotor, the cooling ducts can be arranged radially below the permanent magnets. The permanent magnets can be glued, for example, to the particularly cylindrical outer surface of the laminated core sub-units. Frequently, and in particular at very high machine speeds, it is expedient, however, for the permanent magnets arranged circumferentially to be inserted in axially extending magnetic pockets near the surface. In order to bring about a concentration effect for the rotor flux generated by the permanent magnets, adjacent magnet pockets can be positioned in a V-shape relative to one another. Due to the rotation according to the disclosure of the mutually adjoining laminated core sub-units relative to one another, the permanent magnets of the individual laminated core sub-units are also rotated relative to one another circumferentially. In this advantageous embodiment, this results in the effect of staggering, which can significantly reduce the torque ripple of a dynamoelectric machine having such a rotor.

BRIEF DESCRIPTION FOR THE DRAWINGS

The disclosure is explained in more detail below using the exemplary embodiments shown in the figures.

Figure 2:
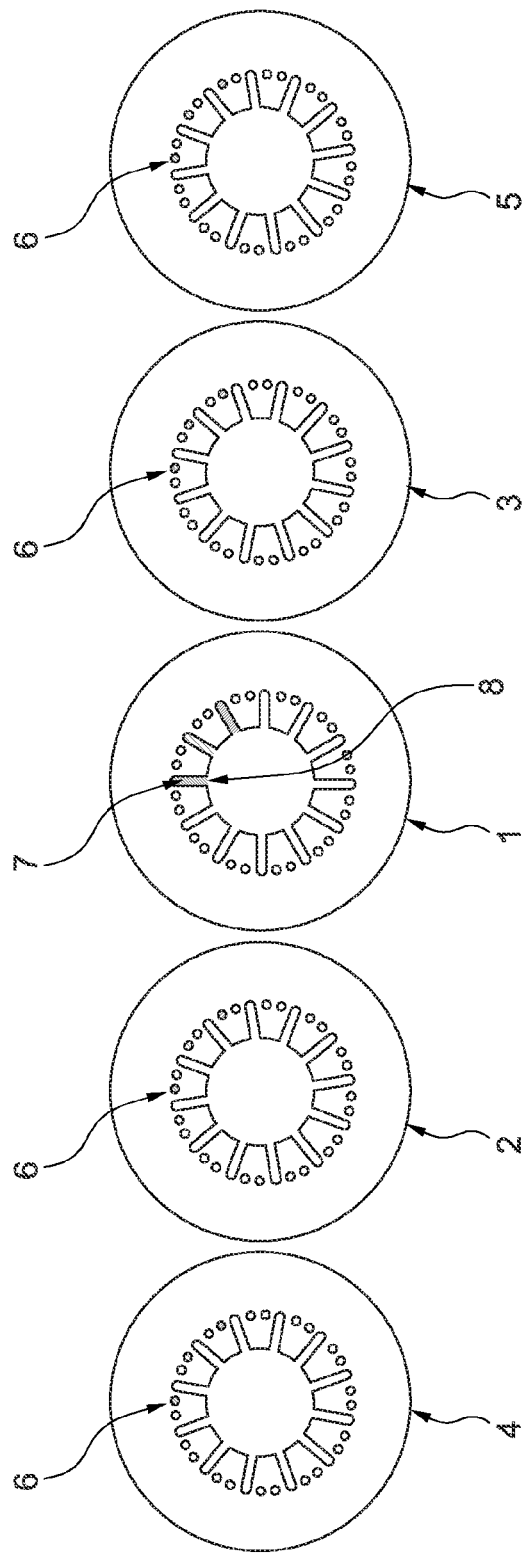
Figure 3:
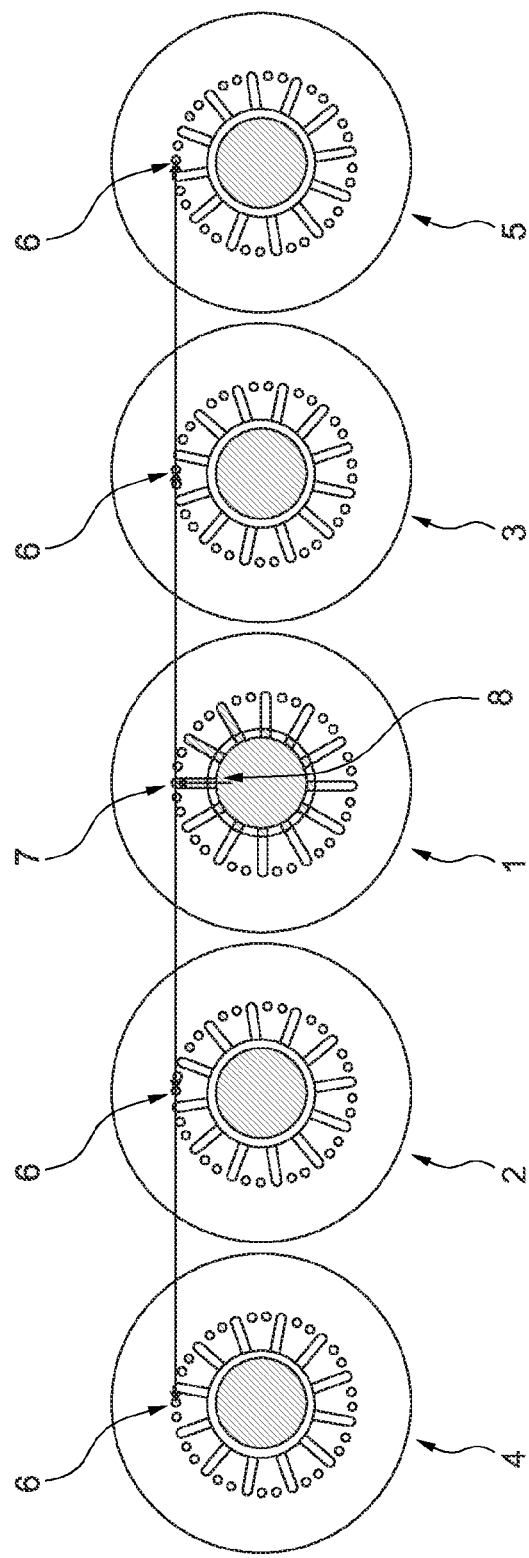
Figure 4:
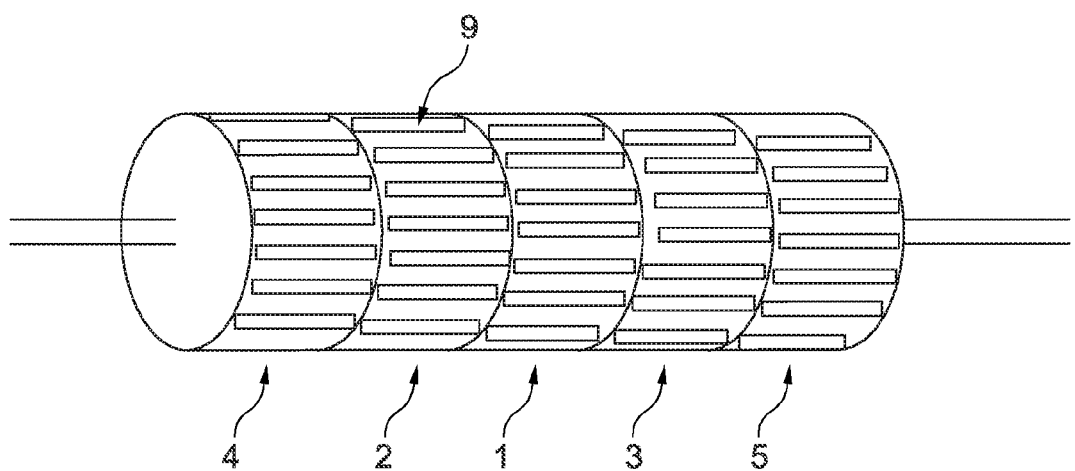

In the figures:

FIG. 1 shows a sectional view to illustrate a coolant path according to an embodiment of the disclosure, FIG. 2 shows an end view of the laminated core sub-units of a rotor according to an embodiment of the disclosure, FIG. 3 shows a schematic illustration of the course of the coolant through the laminated core sub-units according to FIG. 2 and FIG. 4 shows a schematic representation of a staggered rotor according to an embodiment of the disclosure.

DETAILED DESCRIPTION

FIG. 1 shows a sectional view to illustrate a coolant path within an embodiment of the rotor. Sections of the rotor including the rotor shaft 10 and the laminated rotor core 11 as well as a stator spaced apart from the rotor by an air gap 14, including a laminated stator core 12 and a stator winding 13 are shown.

The rotor shaft 10 has an inlet duct 16 which reaches axially to the left of the center of the rotor shaft 10 and is used for the inflow of a coolant medium, in particular an oil, to the laminated rotor core 11. The inlet duct 16 opens into a bore which runs radially inside the rotor shaft 10 and from which the coolant, driven by centrifugal force, finally reaches an inflow duct 7 of the laminated rotor core 11. The inflow duct 7 also reaches substantially radially. This opens into an axially extending cooling duct 6 which reaches between the two end faces of the laminated rotor core 11. The axially extending cooling duct ends at the two end faces of the laminated rotor core 11 at outlet openings from which the coolant emerges and is conducted via deflector plates 15 to winding heads 13 of a stator winding. As the winding heads 13 also represent a significant heat source, it makes sense to integrate them into the coolant path.

Viewed radially, the axially extending cooling ducts 6 lie above the permanent magnets 9. Since the maximum permissible operating temperature of rare earth magnets, such as those often used in powerful electric motors, is limited, it makes sense to keep the distance between the axially extending cooling ducts 6 and the permanent magnets 9 as small as possible.

The laminated rotor core 11 comprises axially adjoining individual laminations which are electrically insulated from one another in order to avoid eddy currents. The inflow duct 7 is realized in that the individual laminations arranged in the central area of the laminated rotor core 11 have a corresponding opening in the sectional plane selected here, which allows the coolant to enter radially. The individual laminations axially adjoining the inflow duct 7 do not have this opening when viewed in the sectional plane shown. Rather, there are bores in the sectional plane of these individual laminations, which make it possible to form the axially extending cooling duct 6. These bores form the outlet openings for the coolant on the two end face-side individual laminations. In order to enable the rotor to be manufactured as economically as possible, its laminated rotor core 11 is nevertheless made up of identical electrical laminations.

In order to explain this, FIG. 2 shows an end face view of the laminated core sub-units 1-5 of a rotor according to an embodiment of the invention. FIG. 3 additionally shows a schematic illustration of the course of the coolant through the laminated core sub-units 1-5 according to FIG. 2.

Overall, the laminated rotor core is made up of the 5 laminated core sub-units 1-5 shown, each of which has a cylindrical shape and consists of individual laminations having the same lamination cross-section. To form the likewise cylindrical laminated rotor core, the five laminated core sub-units 1-5 are arranged axially one behind the other. The entire laminated rotor core accordingly comprises individual laminations all having the same lamination cross-section. This lamination cross-section can be seen in FIG. 2 in a top view.

Each of the laminated core sub-units 1-5 has cooling ducts 6 extending axially, which are distributed circumferentially. In addition, each of the laminated core sub-units 1-5 comprises inflow ducts 7, which are also distributed circumferentially. Viewed in the circumferential direction, the inflow ducts 7 are arranged equidistantly. Between two inflow ducts 7 there are two axially extending cooling ducts 6, which are also always spaced apart by an equal radian measure. The radian measure between two ducts, regardless of whether it is an inflow duct or a cooling duct, is always the same for each individual lamination.

Viewed from left to right in FIG. 2, the laminated core sub-units 1-5 are each rotated counterclockwise by an angle that corresponds to the angle that corresponds to the distance between two adjacent ducts 6, 7, whether these are inflow ducts 7 or cooling ducts 6. In this mutually rotated state, the laminated core sub-units 1-5 shown are stacked axially one on top of the other in the finished laminated rotor core in such a way that a first laminated core sub-unit 1 is located in the axial center of the laminated rotor core.

The different hatchings in FIG. 2 show an example of the coolant flow in three circumferential, adjacent, axially extending cooling ducts 6. The first laminated core sub-unit 1 is supplied with coolant via the rotor shaft. This enters the inflow ducts 7. Due to centrifugal force, the coolant is now conveyed from the first laminated core sub-unit 1 into the adjacent laminated core sub-units, namely into a second laminated core sub-unit 2, 3 on the left and into a third laminated core sub-unit 2, 3 on the right. Due to the rotation of the laminated core sub-units 1-5 relative to one another, the inflow duct 7 of the first laminated core sub-unit 1 overlaps an axially extending cooling duct 6 of the second laminated core sub-unit 2 and the third laminated core sub-unit 3. From there, the coolant passes further into the fourth and fifth laminated core sub-units 4, 5 at the edge, the axial cooling ducts 6 of which also overlap with axial cooling ducts 6 of the second and third laminated core sub-units 2, 3.

The fourth laminated core 4 is also rotated relative to the second laminated core 2 by a rotation angle that corresponds to the distance between the circumferentially adjacent cooling ducts 6. This angular correspondence ensures that the cooling ducts 6 of the fourth laminated core sub-unit 4 overlap with the cooling ducts 6 of the second laminated core sub-unit 2. The conditions are analogous with regard to the third laminated core sub-unit and the fifth laminated core sub-unit 5 rotated relative thereto.

FIG. 4 shows a schematic representation of a staggered rotor according to an embodiment of the disclosure. It shows laminated core sub-units 1-5, the basic structure of which has already been described in connection with FIGS. 2 and 3, in an assembled state. The laminated core sub-units 1-5 are equipped with permanent magnets 9 on their outer circumference. All the individual laminations of the laminated core sub-units 1-5 again comprise the same laminations here. Due to the fact that the structurally identical laminated core sub-units 1-5 are rotated relative to one another by the rotation angle already described, the permanent magnets 9 on the outer circumference of the laminated core sub-units 1-5 are also arranged to be circumferentially offset from one another by this said rotation angle. In this way, what is termed a relay runner is created, which makes a significant contribution to reducing the undesired torque ripple in a dynamoelectric machine.

The concept of rotating individual laminated core sub-units 1-5 with the same lamination cross-section against one another not only enables a very simple production of a liquid-cooled rotor in particular, but also improves the dynamic behavior of the electric machine by the same measure, provided that the laminated core sub-units 1-5 are equipped with permanent magnets 9.

LIST OF REFERENCE SYMBOLS

1-5 Laminated core sub-units
6 Cooling duct
7 Inflow duct
8 Inlet opening
9 Permanent magnets
10 Rotor shaft
11 Laminated rotor core
12 Stator core
13 Stator winding
14 Air gap
15 Deflector plate
16 Inlet duct

The invention claimed is:

1. A rotor of a dynamoelectric radial flux machine, the rotor comprising:
a laminated rotor core having individual laminations stacked axially one above the other, wherein all of said individual laminations have a same lamination cross-section;
a plurality of axially extending and circumferentially distributed cooling ducts and a plurality of substantially radially extending inflow ducts arranged within the laminated rotor core;
the laminated rotor core is formed from laminated core sub-units that are rotated relative to one another in a staggered arrangement; and
each of the individual laminations comprises a plurality of cooling-duct holes and a plurality of inflow-duct holes, wherein the plurality of inflow-duct holes in the individual laminations of a first laminated core sub-unit axially overlap with the plurality of cooling-duct holes in the individual laminations of the remaining laminated core sub-units to form the axially extending cooling ducts, wherein the plurality of inflow-duct holes and the plurality of cooling-duct holes are distributed evenly over a circumference of the individual laminations.

2. The rotor according to claim 1, wherein the plurality of inflow-duct holes and the plurality of cooling-duct holes have a circumferential distance from one another, a radian measure of which corresponds to a rotation angle of axially adjacent ones of the laminated core sub-units.

3. The rotor according to claim 1, wherein the inflow ducts have an inlet opening via which a coolant conducted through a rotor shaft is admittable into the laminated rotor core.

4. The rotor according to claim 1, wherein the first laminated core sub-unit is arranged in a center of the laminated rotor core.

5. The rotor according to claim 1, further comprising permanent magnets arranged circumferentially on the laminated rotor core, wherein the cooling ducts are arranged radially below the permanent magnets.

6. A dynamoelectric machine comprising:
a stator including a stator winding;
a rotor comprising:
a laminated rotor core having individual laminated core sub-units comprising a plurality of individual laminations, wherein all of said individual laminations have a same lamination cross-section, stacked axially one above the other;
axially extending and circumferentially distributed cooling ducts and substantially radially extending inflow ducts arranged within the laminated rotor core;
at least some of the laminated core sub-units are rotated relative to one another in a staggered arrangement; and
each of the laminated core sub-units comprises cooling-duct holes and inflow-duct holes, wherein the substantially radially extending inflow-duct holes of a first laminated core sub-unit axially overlap with the axially extending cooling-duct holes of the remaining laminated core sub-units to form the axially extending cooling ducts; and
a deflector plate disposed at each axial end face of the laminated rotor core, the deflector plate being fluidly connected to the cooling-duct holes and configured to conduct a coolant on winding heads of the stator winding.

7. The dynamoelectric machine according to claim 6, further comprising a rotor shaft which has an axially extending inlet duct connected to one of the inflow ducts for introduction of a coolant.

8. A rotor of a dynamoelectric radial flux machine, the rotor comprising:
a laminated rotor core having individual laminated core sub-units comprising a plurality of individual laminations, wherein all of said individual laminations have a same lamination cross-section, stacked axially one above the other;
axially extending and circumferentially distributed cooling ducts and substantially radially extending inflow ducts arranged within the laminated rotor core;
at least some of the laminated core sub-units are rotated relative to one another in a staggered arrangement; and
each of the laminated core sub-units comprises cooling-duct holes and inflow-duct holes, wherein the substantially radially extending inflow-duct holes of a first laminated core sub-unit axially overlap with the axially extending cooling-duct holes of the remaining laminated core sub-units to form the axially extending cooling ducts, and wherein two cooling-duct holes are positioned between two inflow-duct holes in a repeating pattern about a circumference of each of the laminated core sub-units.

9. The rotor according to claim 8, wherein the inflow-duct holes and the cooling-duct holes are distributed evenly over a circumference of the laminated core sub-units and have a circumferential distance from one another, a radian measure of which corresponds to a rotation angle of axially adjacent ones of the laminated core sub-units.

10. The rotor according to claim 8, wherein the inflow ducts have an inlet opening via which a coolant conducted through a rotor shaft is admittable into the laminated rotor core.

11. The rotor according to claim 8, wherein the first laminated core sub-unit is arranged in a center of the laminated rotor core.

12. The rotor according to claim 8, further comprising permanent magnets arranged circumferentially on the laminated rotor core, wherein the cooling ducts are arranged radially below the permanent magnets.

* * * * *